Nov. 29, 1949  R. E. STORK ET AL  2,489,338
FITTING
Filed May 22, 1946

INVENTORS
RALPH E. STORK
OSCAR A. OLSON
BY
ATTORNEYS

Patented Nov. 29, 1949

2,489,338

UNITED STATES PATENT OFFICE 2,489,338

FITTING

Ralph E. Stork, Hohokus, N. J., and Oscar A. Olson, Scarsdale, N. Y.

Application May 22, 1946, Serial No. 671,594

4 Claims. (Cl. 285—122)

This invention relates to fittings and has for its object fittings of greatly improved construction.

Fittings of the union type, for example, are usually formed of three main parts, a female, a male and a nut. The female part has an enlarged exteriorally threaded end portion. The male part also has an enlarged exteriorally smooth-surfaced end portion, somewhat smaller in outside diameter than the outside diameter of the enlarged end portion of the female part. The enlarged end portion of the male part terminates in an annular shoulder. The nut is interiorally threaded at one end and has a constricted annular end portion at the other end. To assembly the union, the enlarged end portion of the male part is inserted in the enlarged end portion of the female part. The nut is mounted over the male part and the threaded end portion of the nut is screwed onto the threaded portion of the female part until the constricted annular end portion of the nut engages the shoulder of the enlarged end portion of the male part. Turning of the nut is continued until the male and female parts are brought into tight engagement.

Two separate forms of seats are employed to provide a seal. One is the so-called gasket type of union, in which the enlarged end portion of the female part terminates in an outer annular portion surrounding a recessed flat seat adapted to receive a gasket. The enlarged end of the male part terminates in an inner annular portion surrounded by a recessed flat seat. The inner annular portion of the male part is adapted to fit into the outer annular portion of the female part so that the two flat seats are juxtaposed to one another and so that they may be brought into engagement with the gasket. The nut is turned on the threaded portion of the female part until a tight joint is obtained. This is a very common type of construction but has the objection that the parts forming or adjacent to the seal are not easily cleaned. The outer annular portion of the female part is perpendicular to the recessed flat seat; and the inner annular portion of the male part is perpendicular to the enlarged end portion. This construction results in what may be termed a sharp circumferential corner which is difficult to clean, and for that reason the union does not find favor under operating conditions requiring a high degree of cleanliness, such as in the processing of milk and other food products. After each batch of milk is processed, it is customary to take the union apart, remove the gasket, thoroughly clean the male and female parts, insert a clean gasket in the female part, and reassemble the parts.

To overcome the disadvantages of the gasket type just described, a bevel-seat type of union has been proposed. The construction is essentially the same as that of the gasket type, except that the enlarged end portions of the male and female parts are provided with complementary bevelled seats which are usually ground in order to make a tight fit. Thus, a recessed or internal bevelled seat is provided at the free end of the enlarged end portion of the female part and an external bevelled seat is provided at the free end of the enlarged end portion of the male part. When the parts are assembled and the nut is screwed onto the female part as before, the complementary bevel seats are brought into tight engagement with one another. While this construction permits relatively easy cleaning of the parts, it is open to the objection that the bevelled seats sometimes become damaged to such an extent that it is difficult and often impossible to get a tight joint without a regrinding of the bevelled seats. Because leaks frequently occur for this reason, use of the bevel-seat type of union is frequently not permitted where a partial vacuum is to be maintained.

Investigation confirms our discovery that a fitting of the general type under consideration may be constructed in such a manner as always to assure a tight and non-leaking fit. In addition, the construction is one that readily permits cleaning of the parts. The fitting is therefore particularly useful where fittings of the sanitary type are required.

In accordance with the invention, an inner annular recessed flat seat and an outer annular recessed bevel seat are provided in the enlarged end portion of the female part, the bevel seat being adjacent to and forward of the flat seat in an obtuse angle relationship to facilitate cleaning of the seats. The male part is provided with an inner annular exterior flat seat and an outer exterior bevel seat on the enlarged end portion, the bevel seat being adjacent to and rearward of the flat seat in an obtuse angle relationship to facilitate cleaning of the latter seats. The flat seats and the bevel seats are juxtaposed to one another, respectively, when the parts and the nut are assembled.

With a construction of this type, the fitting can be made to have a double seal: one, by a gasket joint between the two flat faces; and, two, by a metal to metal joint between the two bevel seats. These and other features of the invention will

3 be better understood by referring to the accompanying drawing, taken in conjunction with the following description, in which—

Figure 1:
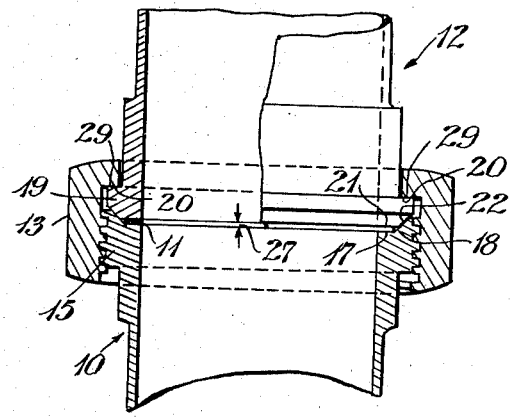
Fig. 1 is a cross-sectional view in part along the longitudinal and transverse axes of a tightly assembled fitting of the union type, illustrative of a practice of the invention.

The fitting shown is in the form of a union comprising a female part 10, a gasket 11, a male part 12, and a nut 13. The female part contains the usual enlarged exteriorly threaded end portion 15. An inner annular recessed flat seat 17 is provided in the enlarged end portion. An outer annular recessed bevel seat 18 is also provided in the enlarged end portion, the bevel seat being adjacent to and forward of the flat seat in an obtuse angle relationship to facilitate cleaning of the seats. The outside diameter and circumference of the flat seat in effect become the inside diameter and circumference, respectively, of the bevel seat.

The male part is also provided with the usual enlarged smooth-surfaced end portion 19 and annular shoulder 20. An inner annular exterior flat seat 21 is provided on the enlarged end portion. An outer annular exterior bevel seat 22 is also provided on the enlarged portion, the bevel seat being adjacent to and rearward of the flat seat in an obtuse angle relationship to facilitate cleaning of the seat.

Figure 2:
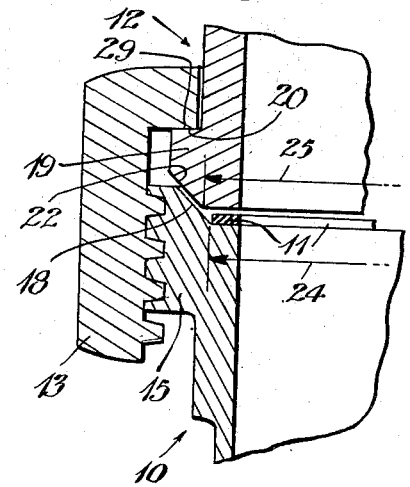
Fig. 2 is an enlarged fragmentary view similar to that of Fig. 1 but showing the fitting in a loosely assembled condition.
Figure 3:
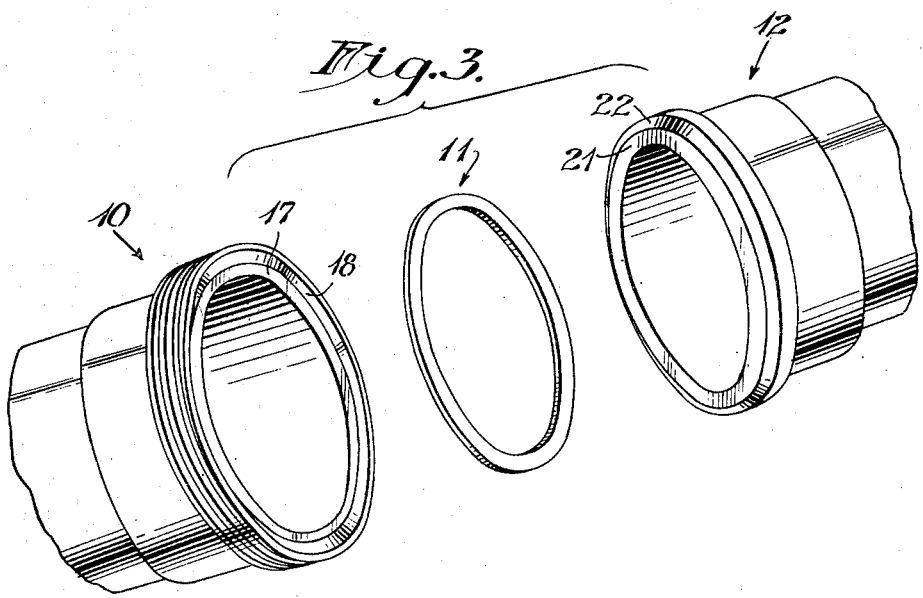
Fig. 3 is a perspective exploded view of the female, gasket and male parts of the fitting of the preceding figures.

As more particularly shown in Figs. 1 and 2, flat seats 17 and 21 and bevel seats 18 and 22 are juxtaposed to one another when the parts are interfitted. The bevel seats have the same pitch, for example 45° to the horizontal. As better shown in Fig. 2, the outside diameter 24 of annular flat seat 17 in the female part is smaller than the outside diameter 25 of annular flat seat 21 on the male part. When, as shown in Fig. 1, bevel seats 18 and 22 are in engagement with one another, a space or gap 27 is provided between flat faces 17 and 21. This space is of predetermined depth to accommodate gasket 11, which has a predetermined thickness. The depth of the space and the thickness of the gasket are co-related so that when nut 13, with its annular shoulder 29 in engagement with annular shoulder 20, is tightly screwed onto the threaded portion of the female part, the bevel seats are brought into tight engagement with each other as the flat seats are also brought into tight engagement with the gasket to assure a double seal.

To assemble the fitting, gasket 11 is placed on flat seat 17 in the female part. The enlarged end portion of the male member is then placed over the gasket so as to bring flat seat 21 in engagement therewith. Nut 13 is then screwed onto the threaded portion of the female part. Annular shoulder 29 of the nut engages annular shoulder 20 of the male part and therefore moves the male and female parts into tighter engagement with one another as the nut is tightly screwed onto the female part. Gasket 11 tends to be compressed and when a tight seal is obtained, in the preferred practice, bevel seats 18 and 22 are also brought into tight engagement. When the fitting is used in this manner, a double seal is assured. This double seal feature is especially adaptable to pipe lines which are used under partial vacuum and which are assembled and disassembled regularly. The bevel seats are preferably ground in order to make a close metal to metal joint or seal. This arrangement is also assurance that the pipes in which the fitting is employed will always have the same length each time the assembly is made.

If the gasket should become defective for any reason, the bevel seal can be relied upon to maintain a tight joint, at least temporarily, so that operations do not have to be halted to replace the gasket. The obtuse angle provided by adjacent flat and bevel seats not only makes it easier to clean the seats but it facilitates placement of the gasket. The double seal arrangement also facilitates better alignment of the parts in making a union.

The double seal is assurance or compensation for irregularities in machined metal seats that occur in use. Other fittings have to be ground to insure a tight fit. Such a fitting, in order to retain the purpose for which intended, must be maintained by accurate and frequent grinding, which is a substantial maintenance cost. If such an irregularity occurs to the machined or ground bevel seats of the fitting of the invention, the gasket between the flat seats can be relied upon to maintain a tight fit, at least temporarily, until a convenient time is found to repair the bevel seat or seats.

While the invention is illustrated as it applies to a union, it will be clear to those skilled in this art that the practice of the invention is applicable to numerous other fittings, such as couplings, tees, crosses, elbows, valves, other similar types of fittings, etc. With the parts fashioned in the manner shown, a tight seal is assured. It will also be clear that the flat and bevel seats may be reversed. For example, the enlarged end of the "male" part may have its flat and bevel seats formed as in the enlarged end of the "female" part; and the enlarged end of the "female" part may have its flat and bevel seats formed as on the enlarged end of the "male" part. With such an arrangement, the double seal feature could still be maintained.

We claim:

1. In a fitting of the type described containing interfitting female and male parts held together by a nut, the improvement comprising an inner annular recessed flat seat and an outer annular recessed bevel seat in the enlarged end portion of the female part, the bevel seat being adjacent to and forward of the flat seat in an obtuse angle relationship to facilitate cleaning of the seats, an inner annular exterior flat seat and an outer annular exterior bevel seat on the enlarged end portion of the male part, the latter bevel seat being adjacent to and rearward of the latter flat seat in an obtuse angle relationship to facilitate cleaning of the seats, said flat seats being juxtaposed to one another and said bevel seats being juxtaposed to one another when the parts and nut are assembled so that when the bevel seats are in engagement with one another a space is provided between the flat seats, and a gasket in said space, the depth of the space and the thickness of the gasket being so co-related that when the bevel seats are brought into tight engagement with each other the flat seats are also brought into tight engagement with the gasket to assure a double seal.

2. In a fitting of the type described containing interfitting female and male parts held together by a nut, the improvement comprising an inner annular recessed flat seat adapted to receive a gasket and an outer annular recessed bevel seat in the enlarged end portion of the female part, the bevel seat being adjacent to and forward of the flat seat in an obtuse angle relationship to facilitate cleaning of the seats, an inner annular exterior flat seat and an outer annular exterior bevel seat on the enlarged end portion of the male part, the latter bevel seat being adjacent to and rearward of the latter flat seat in an obtuse angle relationship to facilitate cleaning of the seats, said flat seats being juxtaposed to one another and said bevel seats being juxtaposed to one another when the parts are interfitted and drawn together by the nut to bring the flat seats into tight engagement with the gasket and the bevel seats into tight engagement with each other.

3. In a fitting of the type described containing interfitting female and male parts held together by a nut, the improvement comprising an inner annular recessed flat seat adapted to receive a gasket of predetermined thickness and an outer annular recessed bevel seat in the enlarged end portion of the female part, the bevel seat being adjacent to and forward of the flat seat in an obtuse angle relationship to facilitate cleaning of the seats, an inner annular exterior flat seat and an outer annular exterior bevel seat on the enlarged end portion of the male part, the latter bevel seat being adjacent to and rearward of the latter flat seat in an obtuse angle relationship to facilitate cleaning of the seats, said flat seats being juxtaposed to one another and said bevel seats being juxtaposed to one another when the parts are interfitted, the outside diameter of the flat seat in the female part being smaller than the outside diameter of the flat seat on the male part to keep the bevel seats out of contact with each other before the flat seats are brought into tight engagement with the gasket.

4. In a fitting of the type described containing interfitting female and male parts held together by a nut, the improvement comprising an inner annular recessed flat seat adapted to receive a gasket of predetermined thickness and an outer annular recessed bevel seat in the enlarged end portion of the female part, the bevel seat being adjacent to and forward of the flat seat in an obtuse angle relationship to facilitate cleaning of the seats, an inner annular exterior flat seat and an outer annular exterior bevel seat on the enlarged end portion of the male part, the latter bevel seat being adjacent to and rearward of the latter flat seat in an obtuse angle relationship to facilitate cleaning of the seats, said flat seats being juxtaposed to one another and said bevel seats having the same pitch and being juxtaposed to one another when the parts are interfitted, the outside diameter of the flat seat on the male part being sufficiently larger than the outside diameter of the flat seat in the female part to provide a space of predetermined depth to accommodate the gasket when the bevel seats are brought into engagement with each other and when the flat seats are brought into tight engagement with the gasket to assure a double seal.

RALPH E. STORK.
OSCAR A. OLSON.

REFERENCES CITED

The following references are of record in the file of this patent:

UNITED STATES PATENTS

| Number | Name | Date |
|---|---|---|
| 1,403,773 | Hanson | Jan. 17, 1922 |
| 1,862,920 | Boynton | June 14, 1932 |
| 2,016,262 | Arey et al. | Oct. 1, 1935 |

FOREIGN PATENTS

| Number | Country | Date |
|---|---|---|
| 94,283 | Switzerland | May 1, 1933 |
| 312,954 | Italy | Mar. 18, 1933 |